(12) United States Patent
Byun et al.

(10) Patent No.: US 8,501,342 B2
(45) Date of Patent: Aug. 6, 2013

(54) RECHARGEABLE BATTERY WITH AN ANTENNA ASSEMBLY

(75) Inventors: Jeongdeok Byun, Yongin-si (KR); Kyungwon Seo, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1007 days.

(21) Appl. No.: 12/061,570

(22) Filed: Apr. 2, 2008

(65) Prior Publication Data
US 2008/0254359 A1    Oct. 16, 2008

(30) Foreign Application Priority Data

Apr. 11, 2007  (KR) .................. 10-2007-0035716

(51) Int. Cl.
*H01M 2/10*  (2006.01)
*H01M 2/04*  (2006.01)
*H01B 1/08*  (2006.01)

(52) U.S. Cl.
USPC ............... 429/162; 429/7; 429/163; 429/122; 429/176

(58) Field of Classification Search
USPC ................. 429/122, 98, 7, 162–180
See application file for complete search history.

(56) References Cited

U.S. PATENT DOCUMENTS

| 6,284,406 | B1 * | 9/2001 | Xing et al. ................. 429/96 |
| 6,943,666 | B2 * | 9/2005 | Mooney et al. ............ 340/10.5 |
| 7,388,350 | B1 * | 6/2008 | Wright ......................... 320/107 |
| 2004/0131897 | A1 * | 7/2004 | Jenson et al. .................... 429/7 |
| 2007/0007345 | A1 * | 1/2007 | Tuttle .............................. 235/435 |
| 2007/0238492 | A1 * | 10/2007 | Kaneko et al. ............... 455/573 |

FOREIGN PATENT DOCUMENTS

| JP | 07169506 | A | * | 7/1995 |
| KR | 10-2006-0068119 | | | 6/2006 |
| KR | 2006068119 | A | * | 6/2006 |

OTHER PUBLICATIONS

Machine translation for Yong et al., KR 10-2006-0068119 A.*

* cited by examiner

*Primary Examiner* — Edu E Enin-Okut
(74) *Attorney, Agent, or Firm* — Christie, Parker & Hale, LLP (57) ABSTRACT

A rechargeable battery is provided including a bare cell having a can. The can has an electrode assembly. The electrode assembly has an electrode terminal withdrawn from one surface of the bare cell. A circuit is electrically coupled to the bare cell. The circuit includes a charge-discharge circuit and an antenna circuit. A case is connected to the electrode terminal for receiving and covering the circuit. An antenna assembly is on an outer surface of the bare cell. The antenna assembly includes a line antenna for receiving a radio frequency signal. The line antenna is coupled to the antenna circuit.

13 Claims, 7 Drawing Sheets

RECHARGEABLE BATTERY WITH AN ANTENNA ASSEMBLY

CROSS-REFERENCE TO RELATED APPLICATION

This application claims priority to and the benefit of Korean Patent Application No. 10-2007-0035716, filed on Apr. 11, 2007, in the Korean Intellectual Property Office, the entire content of which is incorporated herein by reference.

BACKGROUND

1. Field of the Invention

The present invention relates to a rechargeable battery, and more particularly, to a rechargeable battery including an antenna assembly.

2. Description of the Related Art

A rechargeable battery is a battery that can be charged or discharged more than several times. Rechargeable batteries are classified into various types of batteries according to core materials related to charge/discharge and to its shape. Recently, a prismatic type lithium rechargeable battery has been widely used.

The lithium rechargeable battery has been widely applied in various fields because it has power supplying capacity like conventional manganese dry batteries and is reusable by allowing charging/discharging at least more than several ten times. Particularly, the lithium rechargeable battery is used as a main power source for notebook computers, personal digital assistants (PDAs), mobile phones, portable multimedia players, portable game players, and hybrid cars. The application fields of the rechargeable battery are also continuously increased because of its lightweight and relatively high capacitance.

With the development of portable and high-function electronic devices, the rechargeable battery installed in the portable electronic devices has been of small size and light weight so as to have portability and high functionality. In addition, the maintenance of the power supplying capacity of the rechargeable battery has become more important due to miniaturization and the light weight of the rechargeable battery.

In addition to basic functions as a battery, additional functions are being required for the rechargeable battery. The portable electronic devices have a spatial restriction to provide a certain space for installation of the rechargeable battery so as to ensure a power source. However, as the portable electronic devices become smaller, it is troublesome to implement every function in the remaining space excluding the installation space of the battery.

SUMMARY OF THE INVENTION

A rechargeable battery is provided having an antenna assembly for receiving a radio frequency signal that does not require additional space for forming the antenna assembly in portable electronic devices and is free from design restrictions caused by the additional space.

A rechargeable battery is provided including a bare cell having a can. The can has an electrode assembly. The electrode assembly has an electrode terminal withdrawn from one surface of the bare cell. A circuit is electrically coupled to the bare cell. The circuit includes a charge-discharge circuit and an antenna circuit. A case is connected to the electrode terminal for receiving and covering the circuit. An antenna assembly is on an outer surface of the bare cell. The antenna assembly includes a line antenna for receiving a radio frequency signal. The line antenna is coupled to the antenna circuit.

In an exemplary embodiment, an outer case covers the can and the antenna assembly.

In an exemplary embodiment, the antenna assembly includes a first layer; a substrate between an outer surface of the bare cell and the first layer, the line antenna being on the substrate; and a second layer contacting the outer surface of the bare cell.

In an exemplary embodiment, the antenna assembly further includes a metal plate between the substrate and the second layer.

In an exemplary embodiment, the second layer is an adhesive layer.

In an exemplary embodiment, the line antenna has two terminals. One terminal of the line antenna is electrically coupled to the antenna circuit. The other terminal is electrically coupled to the can.

In an exemplary embodiment, the line antenna has two terminals. One terminal of the line antenna is electrically coupled to the antenna circuit and the other terminal passes through the substrate to be electrically coupled to the metal plate.

In an exemplary embodiment, the can includes a barrier wall formed on an outer surface of the can for fixing the antenna assembly.

In an exemplary embodiment, the barrier wall is integral with the can.

In an exemplary embodiment, the barrier wall is in a longitudinal direction of the can.

In an exemplary embodiment, the bare cell further includes a positive electrode, a negative electrode, and a separator. The negative electrode is electrically coupled to the can by a negative electrode terminal.

In an exemplary embodiment, the line antenna includes two spaced antenna patterns on the substrate.

In an exemplary embodiment, a length of each of the two spaced antenna patterns are different from each other.

DETAILED DESCRIPTION

Figure 1:
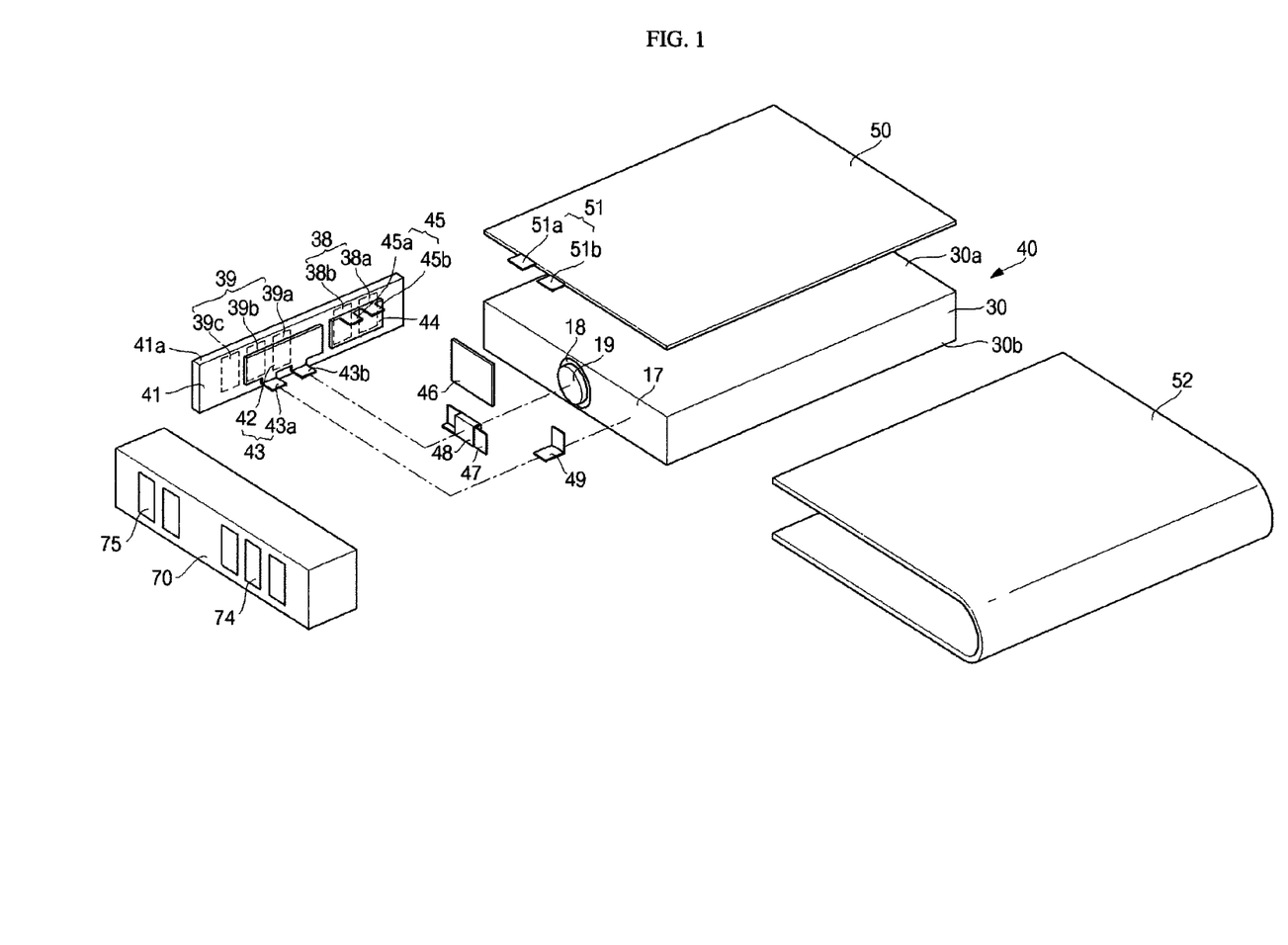
FIG. 1 is an exploded perspective view illustrating a rechargeable battery according to an exemplary embodiment of the present invention.

FIG. 1 is an exploded perspective view illustrating a rechargeable battery according to an embodiment of the present invention. The rechargeable battery includes a bare cell 40, a circuit 41, an antenna assembly 50, an outer case 52, and a case 70. The rechargeable battery may further include connection leads 47, 49; a temperature responsive device 48; and an insulation plate 46.

The bare cell 40 stores power supplied via the circuit 41 and provides the stored power to external devices via the circuit 41. For this, the bare cell 40 includes a can 30 and an electrode assembly received in the can 30. One side of the bare cell 40 is sealed by a cap plate 17 of a cap assembly, and an electrode terminal 19 is exposed to the cap plate 17. In addition, the bare cell 40 is connected to the circuit 41 by connection leads 47, 49, and an antenna assembly 50 is attached to an outer surface of the bare cell 40, that is, an outer surface of the can 30. The structure of the circuit 41 combined with the bare cell 40 is referred to as a core pack. The rechargeable battery includes the core pack which is combined with the antenna assembly 50, an outer case 52 and a case (not shown). In the rechargeable battery, the can 30 may be used as any one of a positive electrode or a negative electrode. Particularly, in the case where the antenna assembly 50 is included in the rechargeable battery, when the can 30 is used as the negative electrode and used as a ground of the antenna assembly, a metal plate included in the antenna assembly 50 can be omitted, but is not limited thereto. This will be explained in detail with reference to drawings below.

The circuit 41 controls charge/discharge of the bare cell 40 and simultaneously provides a charge/discharge path. In addition, the circuit 41 receives a signal from the antenna assembly 50 and relays the signal to an external device. The circuit 41 includes a charge/discharge circuit 42 for controlling charge/discharge of the bare cell 40 and an antenna circuit 44 for relaying signal from the antenna assembly 50. The antenna circuit 44 may include a basic filter circuit like a surface acoustic wave (SAW) filter, but is not limited thereto. The circuit 41 includes a substrate 41a and an electronic device installed on the substrate 41a. A circuit pattern for electrically coupling the electronic device may be formed on the substrate 41a. The circuit pattern and the electronic device are electrically coupled to the bare cell 40 and the antenna assembly 50 through the connection leads 47, 49, 51. In the circuit 41, connection terminals 43, 45 are formed on one side of the substrate 41a for connection with the bare cell 40, and exposed terminals 38, 39 are formed on the other side of the substrate for connection with an external device.

The connection leads 47, 49, 51 are classified into first and second connection leads 47, 49 for electrically coupling the charge/discharge circuit 42 to the bare cell 40, and antenna leads 51a, 51b for connecting the antenna circuit 44 to the antenna assembly 50 through antenna connection leads 45a, 45b of connection terminal 45. The first and second connection leads 47, 49 are not indispensable and the charge/discharge circuit 42 may be directly connected to the bare cell 40 through extension of the connection terminals 43 (43a, 43b) of the charge/discharge circuit 42. The first connection lead 47 is electrically coupled to the electrode terminal 19 of the bare cell 40. The temperature responsive device 48 may be attached to one part of the first connection lead 47, but is not limited thereto. The second connection lead 49 is electrically coupled to the can 30 of the bare cell 40 and provides a conduction path between the can 30 and the connection terminal 43.

An insulation plate 46 is arranged between the first connection lead 47 and the can 30 so as to insulate the first connection lead 47 from the can 30.

The temperature responsive device 48 interrupts the conduction path when the bare cell 40 is charged or discharged. For this, the temperature responsive device 48 is electrically coupled to the first connection lead 47 or the second connection lead 49. The temperature responsive device 48 may include at least one of a thermal fuse and a positive temperature coefficient (PTC).

The exposed terminals 38, 39 are respectively divided into a power supply terminal 39 for charge/discharge and a signal terminal 38 for transmitting a signal received to the antenna assembly 50. The power supply terminal 39 is illustrated in FIG. 1 as a 3-pole terminal, but alternatively the power supply terminal 39 may be formed of a 2-pole terminal. Further, the signal terminal 38 is illustrated in FIG. 1 as a 2-pole terminal, but alternatively the signal terminal 39 may be formed of a 1-pole or a 3-pole terminal.

A first power supply terminal 39a of the power supply terminals of a 3-pole terminal is connected to the positive electrode of the bare cell 40, and a second power supply terminal 39b is connected to the negative electrode of the bare cell 40. A third power supply terminal 39c may be used as a negative electrode terminal or a positive electrode terminal, but is provided for a test terminal. The third power supply terminal 39c may be provided as a test terminal for testing the operation of the temperature responsive device 48 connected to the first connection lead 47, but is not limited thereto.

The signal terminal 38 includes a first signal terminal 38a and a second signal terminal 38b. The first signal terminal 38a is connected to an antenna of the antenna assembly 50, and the second signal terminal 38b is electrically coupled to a metal plate of the antenna assembly 50. The connection relationship between the antenna assembly 50 and the signal terminal 38 will be explained in detail below.

The antenna assembly 50 receives a radio frequency (RF) signal and provides the received signal for an external device through the antenna circuit 44. The RF signal may include broadcasting signals including Digital Multimedia Broadcasting (DMB) signals, Radio Frequency Identification (RFID) scan signals, smart card scan signals, and the like. The antenna assembly 50 may include a line antenna for receiving the RF signal, a substrate on which the line antenna is formed, a metal plate for providing a ground and a protection layer for protecting those elements, but is not limited thereto. Detailed construction, characteristics and shape of the antenna assembly 50 will be explained below with reference to the drawings. Because the antenna assembly 50 should have length corresponding to ¼ of the wavelength of a received signal, the antenna assembly 50 is attached to the widest surface 30a of the bare cell 40 if possible. However, when it is possible to ensure sufficient length of the antenna, the antenna assembly 50 may be attached to a narrow surface (e.g., surface 30b, or a side surface), but is not limited thereto.

The outer case 52 insulates the bare cell 40, particularly, the can 30 from the exterior, and protects the antenna assembly 50. To insulate, the outer case 52 may have an area for surrounding the antenna assembly 50 sufficiently, and may have a size and shape for surrounding most of the exposed surface of the can 30. The outer case 52 may be formed of paper, synthetic resin film or a mixture product thereof, but is not limited thereto. The synthetic resin may include vinyl, Polyethyleneterephthalate (PET), polypropylene, polyethylene, epoxy, phenol, polyimide, and the like, but is not limited thereto.

The case 70 is combined with the bare cell 40 so as to receive and cover the circuit 41. For this, the case 70 may be used in the form of a hard case manufactured by injection molding in advance or may be formed by resin molding using hot melt resin. The case 70 typically has an insulation property and mechanical stiffness for protecting the circuit 41. Further, a plurality of signal terminal holes 75 and power supply terminal holes 74 may be formed in the case 70 so as to expose the signal terminal 38 and the power supply terminal 39 to the exterior.

Figure 2:
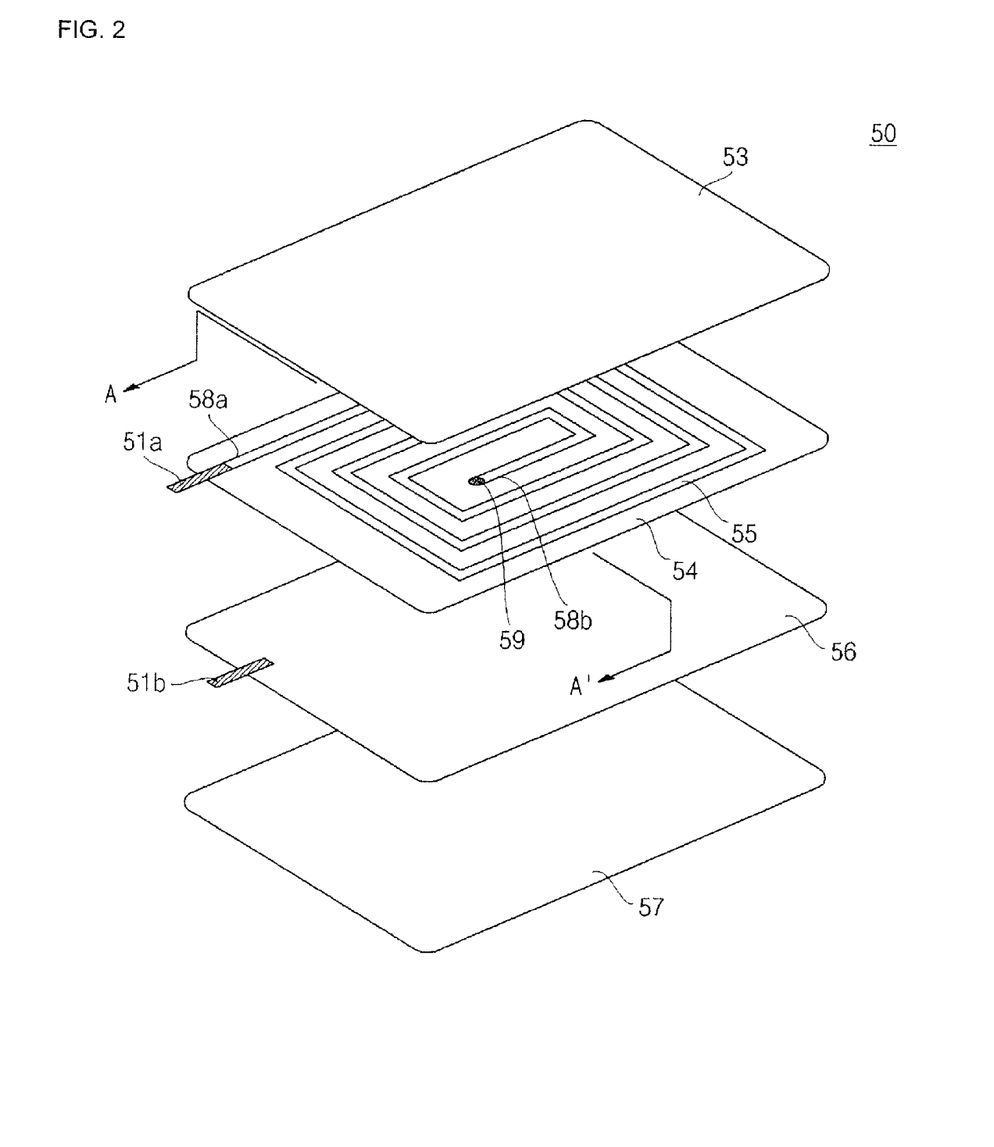
FIG. 2 is an exploded perspective view illustrating one example of an antenna assembly according to the present invention.
Figure 3:
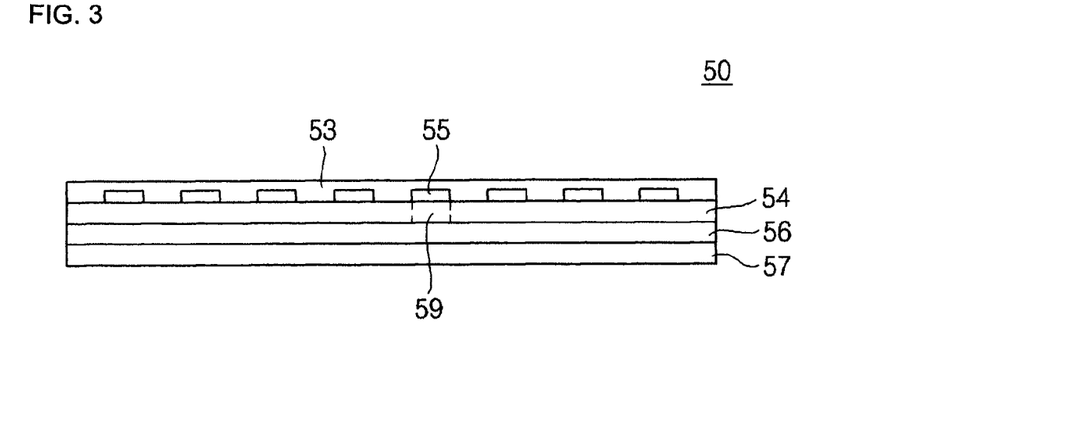
FIG. 3 is a sectional view taken along A-A' line of FIG. 2.

FIG. 2 is an exploded perspective view illustrating one example of an antenna assembly according to the present invention and FIG. 3 is a sectional view taken along A-A' line of FIG. 2. As depicted in FIG. 2 and FIG. 3, the antenna assembly 50 may have a structure constructed of five layers including a first layer 53, a substrate 54, a line antenna 55, a metal plate 56, and a second layer 57.

The first layer 53 is a protection layer to insulate the lower layers from the exterior and protect them from physically contacting the exterior. The first layer 53 may be formed of plastic resin having good insulation property or may be formed of paper or a two-layer structure of paper and resin like the outer case 52, but is not limited thereto.

The substrate 54 includes the line antenna 55 formed on it and supports the line antenna 55 and simultaneously insulates the line antenna 55 from the metal plate 56. For this, the substrate 54 may be formed of hard resin such as phenol resin and epoxy resin, or may be formed of flexible circuit board material such as polyimide, but is not limited thereto.

The line antenna 55 may be formed by patterning metal foil on the substrate 54 or by attaching metal wire to the substrate. The line antenna receives external signals. The line antenna 55 may be formed by gold (Au), silver (Ag), copper (Cu), platinum (Pt), palladium (Pd), and alloys of these metals or their equivalent metals, but is not limited thereto. The line antenna 55 shown in FIG. 2 is a spiral type line antenna 55 rotating in clockwise direction. One terminal 58a of the line antenna 55 is electrically and mechanically combined to the first antenna lead 51a. Further, the other terminal 58b of the line antenna 55 is electrically coupled to the metal plate 56 through a contact hole 59 formed on about center of the substrate. The spiral line antenna 55 in FIG. 2 is illustrated as an example, but is not limited thereto. The length of the line antenna 55 is variable according to the wavelength of an RF signal to be received, and generally is set so as to be ¼ of the wavelength of the RF signal.

The metal plate 56 is attached on a lower surface of the substrate 54. The metal plate 56 is electrically coupled to the line antenna 55 by the contact hole 59 and is electrically coupled to the antenna circuit 44 by the second antenna 51b. The metal plate 56 may be formed by gold (Au), silver (Ag), copper (Cu), platinum (Pt), palladium (Pd), and alloys of these metals or their equivalent metals, but is not limited thereto. Further, the metal plate 56 may be formed by any one method of deposition, coating, printing, and the like of a selected metal, or may be formed by inserting an additionally made metal thin plate, but is not limited thereto.

The second layer 57 insulates the metal plate 56 and the elements stacked above the metal plate 56 from the bare cell 40. The second layer 57 is attached to an outer surface of the bare cell 40 so as to combine the antenna assembly 50 with the bare cell 40. Because of this, an additional adhesive layer may be formed on the second layer 57, or the second layer 57 may be formed of adhesive material, but is not limited thereto.

Figure 4A:
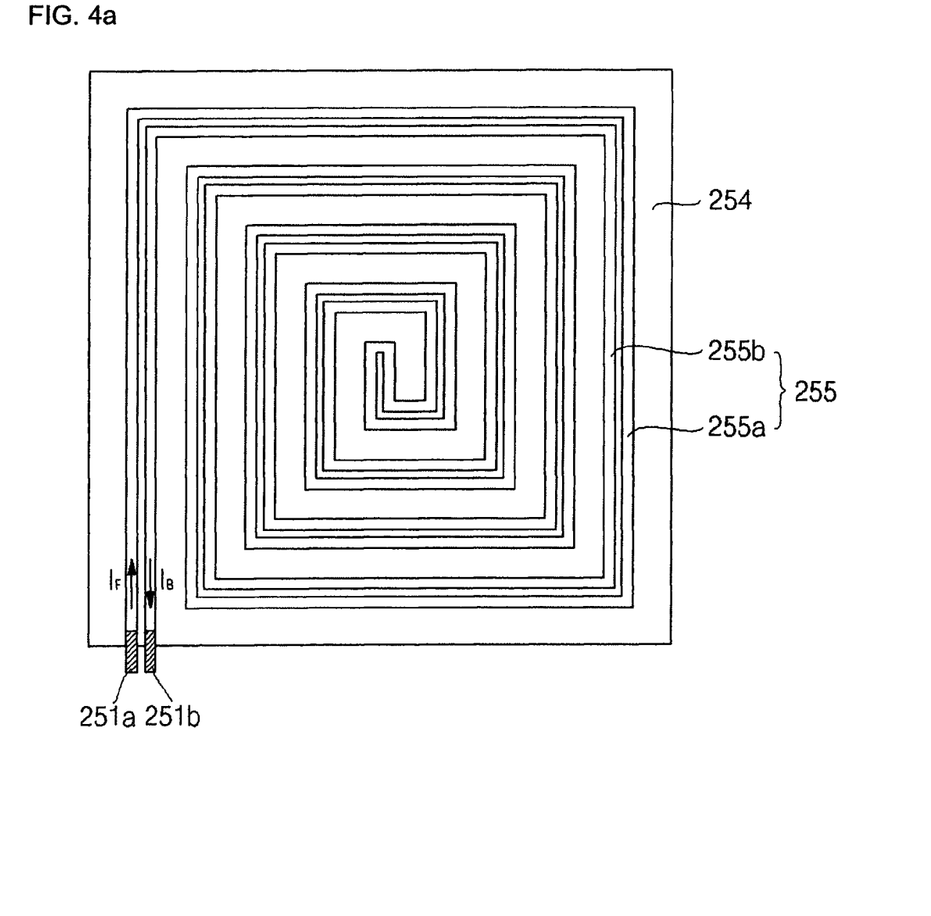
FIG. 4a is an exemplary view illustrating a pattern type of a feedback line antenna.
Figure 4B:
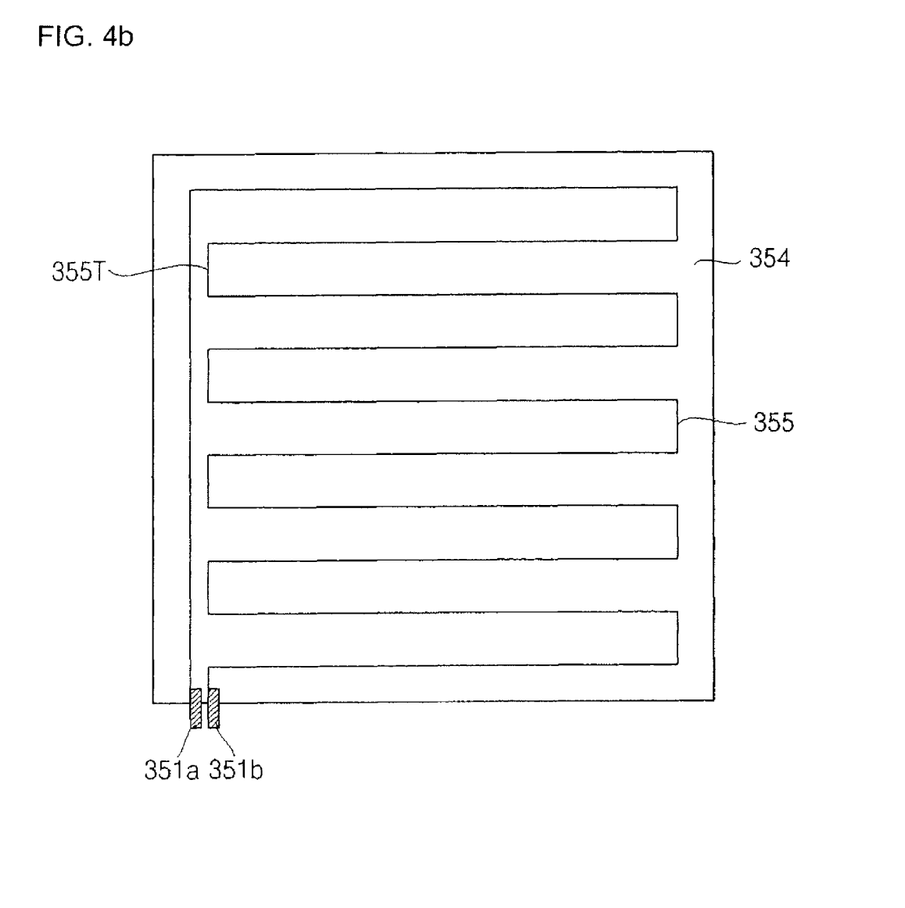
FIG. 4b is another exemplary view illustrating a zig-zag type line antenna.
Figure 4C:
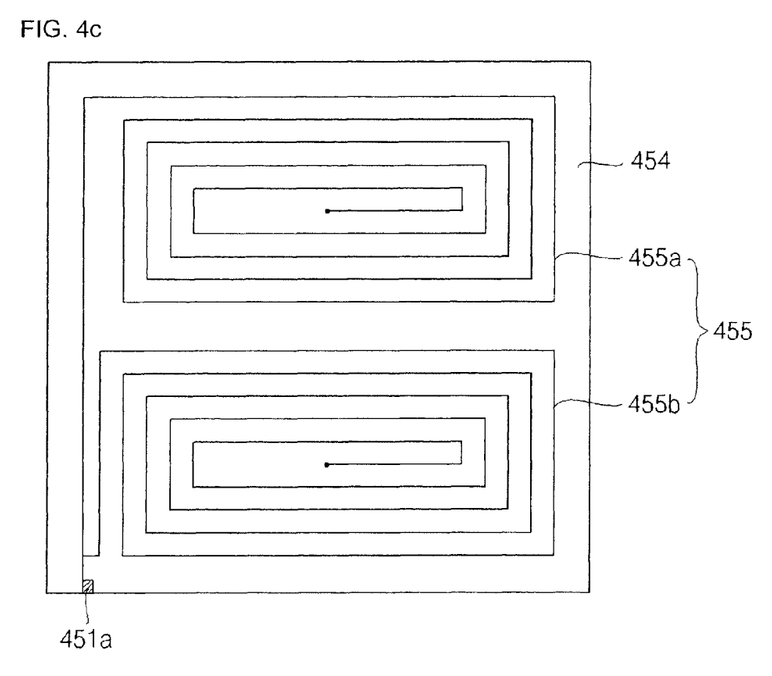
FIG. 4c is another exemplary view illustrating a line antenna receiving external signals having different frequencies.

FIG. 4a, FIG. 4b, and FIG. 4c are exemplary views illustrating various examples of a line antenna. FIG. 4a is an exemplary view illustrating a pattern type of a feedback line antenna, FIG. 4b is an exemplary view illustrating a zig-zag type line antenna, and FIG. 4c is an exemplary view illustrating an example of a line antenna receiving external signals having different frequencies.

Referring to FIG. 4a, the line antenna 255 on substrate 254, unlike the antenna depicted in FIG. 2 and FIG. 3, may be formed without the metal plate, and the second layer may be omitted or an adhesive layer may be used. That is, in the line antenna depicted in FIG. 4a, the layer structure has been simplified by forming a backward pattern of signal current on the same surface instead of the metal plate.

If the line antenna 255 receives an RF signal, a forward current IF is generated by electromagnetic interruption. The forward current IF from the antenna circuit flows through a first antenna lead 251a and flows along a forward line pattern 255a of the line antenna 255 formed in spiral type and then flows along the backward line pattern 255b at the central part of the substrate. In this case, a backward current IB flowing along the backward line pattern 255b flows to the antenna circuit through a second antenna lead 251b so as to transmit the signal. Because of this, the RF signal can be smoothly received and transferred without the additional metal plate as shown in FIG. 2 and FIG. 3.

The line antenna shown in FIG. 4b includes a line pattern formed in zig-zag type on substrate 354 including first and second antenna leads 351a, 351b. Referring to FIG. 4a, a forward line pattern and a backward line pattern are formed near each other, but in FIG. 4b, only the forward line pattern is formed. Also in the case where the line antenna 355 is formed by using the line pattern of FIG. 4b, the antenna assembly can be formed without the metal plate. Referring to FIG. 4a, when the line antenna 255 receives the RF signal, a forward current IF is generated and the generated forward current IF is changed to the backward current IB at the center of the substrate to be returned. Referring to FIG. 4a, directions of currents in a pair of line pattern, that is, the forward line pattern and backward line pattern are opposite each other.

On the other hand, referring to FIG. 4b, there are pairs of line patterns, and pairs of forward line patterns and backward line patterns near a bending part 355T where the line pattern is bent. Except for this difference, the line antennas in FIG. 4a and FIG. 4b are similar to each other in that the metal plate can be omitted and current flows along the pattern of the line antennas 255, 355 formed on the same substrate.

Referring to FIG. 4c, two line antennas 455a, 455b are formed on a substrate 454. The form of the combined line antenna 455 shown in FIG. 4c is constructed similar to the line antenna 55, but is not limited thereto. The forms of the line antennas shown in FIG. 4a and FIG. 4b may be applicable. The construction shown in FIG. 4c is used in the case where there are at least two frequency bands of the RF signal. For example, when the RF signal is a terrestrial DMB signal, a frequency near 200 MHz corresponding to a constant band of VHF range is used. For example, when the RF signal is a smart card scan signal or an RFID scan signal, the signals are transmitted or scanned by using various frequency bands such as 100~500 KHz, 850~950 MHz, 2.4~5.8 GHz. In this case, a line antenna 455a for receiving a DMB signal and a line antenna 455b for receiving a scan signal should be separately constructed. One method of constructing the line antennas is a line antenna shown in FIG. 4c. That is, two kinds of line antennas 455 may be formed by dividing the substrate 454 into two regions and forming the line antenna 455a for receiving a DMB signal on one region and forming the line antenna 455b for receiving the scan signal on the other region without an additional substrate. In this case, the line patterns of each line antenna are spaced apart from each other by a sufficient distance to prevent signal interruption.

In FIG. 4c, the first line antenna 455a and the second line antenna 455b share one first antenna lead 451a, but separate antenna leads may be used for each line antenna 455a, 455b. Further, in the case where the line antenna in FIG. 4c is constructed by using the line antennas shown in FIG. 4a and FIG. 4b, the metal plate can be omitted. On the other hand, in the case where the line antenna in FIG. 4c is constructed by using the line antennas shown in FIG. 2 and FIG. 3, the metal plate for ground of the first and the second line antennas 455a, 455b can be included, but is not limited thereto.

Figure 5:
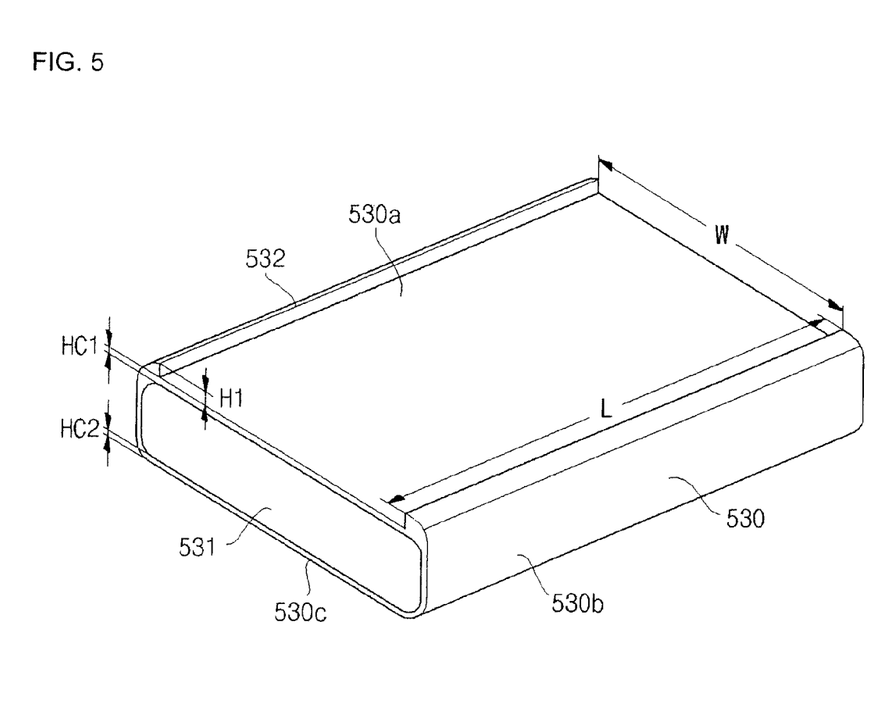
FIG. 5 is an exemplary view illustrating a type of a can for attachment of a line antenna.

FIG. 5 is an exemplary view illustrating a type of a can for attachment of a line antenna. Referring to FIG. 5, an antenna assembly including a line antenna is attached to an outer surface of the can 530. The antenna assembly may be attached to the outer surface of the can 530 by an adhesive means, but may be attached by an outer case like a label. However, the attachment of the antenna assembly by an adhesive means or a label may have weak mechanical stiffness. As such, the antenna assembly may become damaged. However, when an additional receiving space is provided in the rechargeable battery to avoid this problem, the size of the rechargeable battery may become large. Accordingly, pursuant to the present invention, the antenna assembly can be securely attached by forming a barrier wall 532 on a part of the can 530 as shown in FIG. 5.

As described above, in an exemplary embodiment, the antenna assembly is attached to the widest surface of the can 530 because the length of the line antenna should be ¼ of the wavelength of a received RF signal. Particularly, the length of the line antenna for receiving a terrestrial DMB signal should be about 20 cm. Accordingly, it is difficult to manufacture an antenna assembly that can be attached to a narrow side surface, that is, a second surface 530b of the can 530, but the antenna assembly can nevertheless be attached to the second surface 530b of the can 530.

Thus, the antenna assembly may be attached to a wide surface, that is, a first surface 530a of the can. For this, a barrier wall 532 is formed on the first surface 530a. In FIG. 5, the barrier wall 532 is formed on the boundary of the first surface 530a and the second surface 530b, but is not limited thereto. That is, the barrier wall 532 may be formed near the center of the first surface 530a because a distance W between the barrier walls 532 is changed according to the width of the antenna assembly.

When the barrier wall 532 is formed on the can 530, in an exemplary embodiment, the barrier wall 532 is formed in longitudinal direction L as shown in FIG. 5. Of course, the barrier wall 532 may be formed on all of four sides of the first surface 530a. Or, the barrier wall 532 may be formed only on the surface in transverse direction W, but in this case, it may become difficult to manufacture the can 530.

The can 530 included in the rechargeable battery is formed so as to have an inner cavity 531 by a deep drawing method. The device of manufacturing the can by the deep drawing method includes a pressing device for pressing base material of the can 530 and a mold for guiding deformation of the base material according to the pressure. The can 530 is formed by placing the base material on the mold and pushing the base material in the mold. In this case, a projection corresponding to a shape of a cavity is formed in the pressing device so as to press the base material and the shape of the can is changed according to the form of the mold. That is, because the pressing device presses the base material in longitudinal direction, the barrier wall 532 formed in longitudinal direction L can be formed even by the deep drawing method. However, because an additional pressing process or cutting process is required to form a barrier wall in transverse direction W, the production cost of the can 530 may be increased. However, the barrier wall in transverse direction W may be formed for fixing the antenna assembly securely.

In an exemplary embodiment, the height H1 of the barrier wall 532 is similar to the thickness of the antenna assembly. When the height H1 of the barrier wall 532 is smaller than the thickness of the antenna assembly, a part of the antenna assembly is projected above the barrier wall 532, and therefore the appearance is unattractive and it is difficult to protect the antenna assembly by the outer case like a label.

Further, in an exemplary embodiment, the thickness HC1 of the first surface 530a is the same as the thickness HC2 of the facing surface 530c. When the thickness HC1 of the first surface 530a is thinner than the thickness HC2 of the facing surface 530c, the rechargeable battery may be easily broken, and therefore the thickness HC1 of the first surface 530a should be properly adjusted. However, when the thickness of the rechargeable battery becomes too thick by applying the antenna assembly, the thickness HC1 of the first surface 530a may be thinner than the thickness of the facing surface 530c or the thickness of the second surface 530b.

Figure 6:
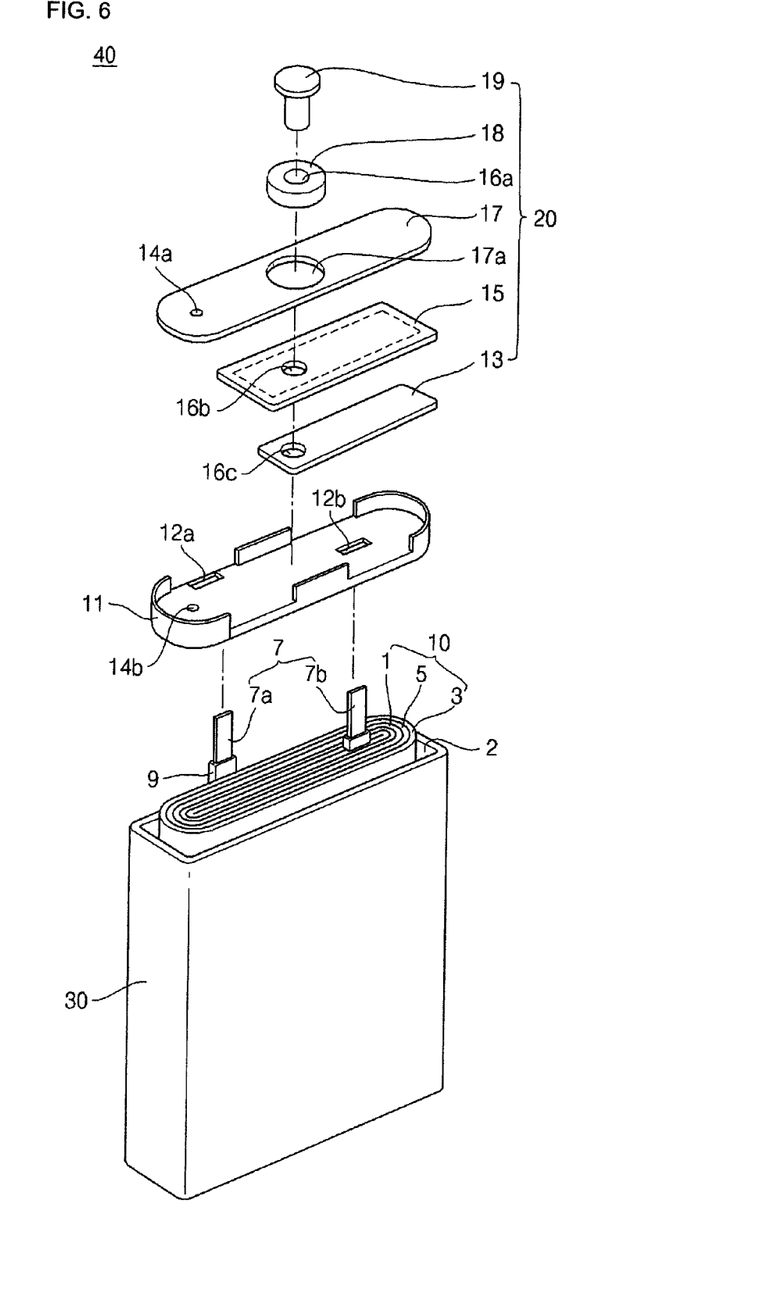
FIG. 6 is an exploded perspective view illustrating one example of the bare cell of FIG. 1.

FIG. 6 is an exploded perspective view illustrating one example of the bare cell of FIG. 1. As depicted in FIG. 6, the bare cell 40 includes a can 30, an electrode assembly 10, an insulation case 11, and a cap assembly 20.

The can 30 is a container of the type of a roughly rectangular pillar (or well 2) and may be easily formed by deep drawing as described above. The can 30 receives the electrode assembly 10, the insulation case 11, and the cap assembly 20, and is sealed by a cap plate 17 of the cap assembly 20. The can 30 is formed of metals having excellent mechanical and electrical properties such as heat resistance, abrasion resistance, and electro-conductivity. The metals include aluminum, aluminum alloy, and the like, but is not limited thereto. The material of the can 30 may be changed according to the application. Further the can 30 may be used as a positive electrode or a negative electrode by being connected to a positive electrode terminal 7b or a negative electrode terminal 7a of the electrode assembly 10. However, when the metal plate of the antenna assembly is omitted, the can 30 may be used as the negative electrode of the rechargeable battery by being electrically coupled to the negative electrode 7a, but is not limited thereto.

In the electrode assembly 10, a positive electrode 1 and a negative electrode 3 may be formed in wide plate type or metal foil and a separator 5 may be interposed and stacked between the positive electrode 1 and the negative electrode 3 for increasing electrical capacitance. Further, a jelly-roll electrode assembly in which the stacked electrode assembly has been wound in one direction may be used, but is not limited thereto.

The positive electrode 1 and the negative electrode 3 may be respectively formed by coating and drying slurry on aluminum metal foil and copper metal foil. In this case, the slurry contains each active material of the positive electrode or the negative electrode and a fixing agent for sticking each active material to the metal foil. Lithium-containing oxide may be mainly used as the positive electrode active material and any one of hard carbon, soft carbon, graphite, and carbon material may be mainly used as the negative electrode material, but is not limited thereto.

The separator 5 is interposed between the positive electrode 1 and the negative electrode 3 to insulate the positive electrode 1 from the negative electrode 3. In addition, the separator 5 provides a path for ion movement between the positive electrode 1 and the negative electrode 3. For this, the separator 5 may be formed of any one selected from the group consisting of porous polyethylene, polypropylene, polyethylene, co-polymer of polypropylene, and the like, or a composition of them, but is not limited thereto. The separator 5 may be formed wider than the width of the positive electrode 1 and the negative electrode 3 so as to prevent an electrical short between the positive electrode 1 and the negative electrode 3.

The positive electrode terminal 7b and the negative electrode terminal 7a, respectively connected to the positive electrode 1 and the negative electrode 3, are withdrawn from the electrode assembly 10. The positive electrode terminal 7b and the negative electrode terminal 7a are used as primary conduction paths to an external circuit or device. For this, the positive electrode terminal 7b may be electrically coupled to a terminal plate 13 and the negative electrode terminal 7a may be electrically coupled to the can 30. Further, the part where the terminals 7 (7a, 7b) are withdrawn from the electrode assembly 10 is insulated by insulation material such as an insulation tape 9 so as to prevent the electrical short between the positive electrode 1 and the negative electrode 3.

The insulation case 11 is received in the can 30 to seal the can 30. The insulation case 11 may be formed in the type that a part of the electrode assembly 10 is supported on one side of the insulation case. Lead through-holes 12a, 12b for withdrawing the terminals 7 and an electrolytic solution feeding-hole 14b are formed in the insulation case 11.

The cap assembly 20 includes a cap plate 17, an electrode terminal 19, an insulation plate 15, a terminal plate 13, and a gasket 18.

A terminal through-hole 17a and an electrolytic solution feeding-hole 14a are formed in the cap plate 17. The electrode terminal 19 passes through the terminal through-hole 17a with the gasket 18 interposed between them so as to be electrically coupled to the terminal plate 13. For this, a first terminal through-hole 16a is formed in the gasket 18. The cap plate 17 is electrically coupled to the negative electrode terminal 7a withdrawn through the lead through-hole 12a of the insulation case 11.

The electrolytic solution feeding-holes 14a, 14b are formed in the cap plate 17 and the insulation case 11. The electrolytic solution feeding-holes 14a, 14b are used as feeding-holes for feeding the electrolytic solution into the can 30 and are sealed after feeding of the electrolytic solution.

The insulation plate 15 is interposed between the cap plate 17 and the terminal plate 13 so as to insulate the cap plate 17 from the terminal plate 13. The electrode terminal 19 passes through the insulation plate 15. For this, a second terminal hole 16b is formed in the insulation plate 15.

The terminal plate 13 is electrically coupled to the electrode terminal 19 and the positive electrode terminal 7b. A third terminal hole 16c is formed in the terminal plate 13 so as to electrically couple the terminal plate 13 to the electrode terminal 19.

As described above, the rechargeable battery according to the present invention produces the following effects.

First, the rechargeable battery provides the antenna assembly for receiving an RF signal that does not require additional space for forming the antenna assembly in portable electronic devices.

Second, the rechargeable battery can receive RF signals in different frequency bands by forming two antenna patterns on a substrate so as to realize multi-function.

Third, the rechargeable battery can use stably the antenna assembly by fixing the antenna assembly with the barrier wall formed on the outer surface of the can.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A rechargeable battery comprising:
    a bare cell comprising a can having an electrode assembly and an electrode terminal extending from one surface of the bare cell;
    a battery circuit electrically coupled to the bare cell, the battery circuit comprising a bare cell charge-discharge circuit and an antenna circuit;
    a case connected to the electrode terminal for receiving and covering the battery circuit; and
    an antenna assembly on an outer surface of the can of the bare cell, the outer surface being different from the one surface of the bare cell facing the battery circuit, the antenna assembly comprising:
        a line antenna for receiving a radio frequency signal, the line antenna being coupled to the antenna circuit;
        a first layer covering the line antenna;
        a substrate between the outer surface of the bare cell and the first layer, the line antenna being on the substrate; and
        a second layer between the substrate and the outer surface of the bare cell,
    wherein the outer surface of the can is coupled to at least one side surface of the can that is narrower than the outer surface, and the outer surface has two opposite barrier walls for fixing the antenna assembly thereto and two opposite sides having open ends defined by the barrier walls.

2. The rechargeable battery of claim 1, further comprising an outer case covering the can and the antenna assembly.

3. The rechargeable battery of claim 1, wherein the second layer contacts the outer surface of the bare cell.

4. The rechargeable battery of claim 3, wherein the antenna assembly further comprises:
    a metal plate which is between the substrate and the second layer and is electrically coupled to the line antenna.

5. The rechargeable battery of claim 3, wherein the second layer is an adhesive layer.

6. The rechargeable battery of claim 1, wherein the line antenna has two terminals, one terminal of the line antenna being electrically coupled to the antenna circuit, and the other terminal being electrically coupled to the can.

7. The rechargeable battery of claim 4, wherein the line antenna has two terminals, one terminal of the line antenna being electrically coupled to the antenna circuit and the other terminal passing through the substrate to be electrically coupled to the metal plate.

8. The rechargeable battery of claim 1, wherein the barrier walls are integral with the can.

9. The rechargeable battery of claim 1, wherein each of the barrier walls extends from an end of the can adjacent the case to an opposite end of the can.

10. The rechargeable battery of claim 6, wherein the bare cell further comprises a positive electrode, a negative electrode, and a separator, the negative electrode being electrically coupled to the can by a negative electrode terminal.

11. The rechargeable battery of claim 3, wherein the line antenna comprises two spaced antenna patterns on the substrate.

12. The rechargeable battery of claim 11, wherein a length of each of the two spaced antenna patterns are different from each other.

13. A rechargeable battery comprising:
    a bare cell comprising a can having an electrode assembly and an electrode terminal extending from one surface of the bare cell;

a battery circuit electrically coupled to the bare cell, the battery circuit comprising a bare cell charge-discharge circuit and an antenna circuit;

a case connected to the electrode terminal for receiving and covering the battery circuit; and an antenna assembly on an outer surface of the can of the bare cell, the outer surface being different from the one surface of the bare cell facing the battery circuit, the antenna assembly comprising:

a line antenna for receiving a radio frequency signal, the line antenna being coupled to the antenna circuit;

a first layer covering the line antenna;

a substrate between the outer surface of the bare cell and the first layer, the line antenna being on the substrate; and a second layer between the substrate and the outer surface of the bare cell, wherein two opposite barrier walls are formed on the outer surface for fixing the antenna assembly thereto, and wherein the distance between the barrier walls corresponds to the width of the antenna assembly, and two opposite sides have open ends defined by the barrier walls.

\* \* \* \* \*